United States Patent
Nagura (10) Patent No.: US 10,170,002 B2
(45) Date of Patent: Jan. 1, 2019

(54) IN-VEHICLE LIGHTING APPARATUS HAVING A LIGHTING DEVICE INCLUDING A LIGHT SOURCE IN EACH OF THE DIRECT AND INDIRECT LIGHTING PARTS THEREOF

(71) Applicant: DENSO CORPORATION, Kariya, Aichi (JP)

(72) Inventor: Michinaga Nagura, Kariya (JP)

(73) Assignee: DENSO CORPORATION, Kariya, Aichi-pref (JP)

( * ) Notice: Subject to any disclaimer, the term of this patent is extended or adjusted under 35 U.S.C. 154(b) by 0 days.

(21) Appl. No.: 15/861,822

(22) Filed: Jan. 4, 2018

(65) Prior Publication Data

US 2018/0218611 A1   Aug. 2, 2018

(30) Foreign Application Priority Data

Feb. 1, 2017   (JP) ................................. 2017-016716

(51) Int. Cl.
| | |
|---|---|
| *B60Q 1/00* | (2006.01) |
| *G08G 1/16* | (2006.01) |
| *B60Q 3/20* | (2017.01) |
| *B62D 25/04* | (2006.01) |
| *B60Q 3/70* | (2017.01) |
| *B60Q 3/80* | (2017.01) |
| *B60Q 3/60* | (2017.01) |
| *B60Q 3/30* | (2017.01) |
| *B60Q 3/59* | (2017.01) |

(52) U.S. Cl.
CPC ............... *G08G 1/167* (2013.01); *B60Q 3/20* (2017.02); *B60Q 3/60* (2017.02); *B60Q 3/70* (2017.02); *B60Q 3/80* (2017.02); *B62D 25/04* (2013.01); *B60Q 3/30* (2017.02); *B60Q 3/59* (2017.02)

(58) Field of Classification Search
CPC ............... B60Q 3/20; B60Q 3/30; B60Q 3/59
USPC .................................... 362/471, 488; 315/77
See application file for complete search history.

(56) References Cited

U.S. PATENT DOCUMENTS

| | | | | |
|---|---|---|---|---|
| 2010/0302020 | A1* | 12/2010 | Lenneman | B60K 35/00 340/441 |
| 2015/0375677 | A1* | 12/2015 | Salter | B62D 1/06 362/510 |

FOREIGN PATENT DOCUMENTS

| | | |
|---|---|---|
| JP | 2007-334598 A | 12/2007 |
| JP | 2013-161257 A | 8/2013 |

\* cited by examiner

*Primary Examiner* — Thuy Vinh Tran
(74) *Attorney, Agent, or Firm* — Harness, Dickey & Pierce, P.L.C.

(57) ABSTRACT

An in-vehicle lighting apparatus includes a lighting device attached to an instrument panel at a lower part of a vehicle A-pillar in an interior compartment of a subject vehicle. The in-vehicle lighting apparatus has a vehicle information obtainer for obtaining information about a state of the vehicle, and a light controller for controlling the lighting device based on the vehicle information obtained by the vehicle information obtainer. The lighting device includes an indirect lighting part that directs light from a light source toward a surface of the A-pillar, for enabling an effective notification of vehicle information and events to a driver of the subject vehicle.

9 Claims, 6 Drawing Sheets

IN-VEHICLE LIGHTING APPARATUS HAVING A LIGHTING DEVICE INCLUDING A LIGHT SOURCE IN EACH OF THE DIRECT AND INDIRECT LIGHTING PARTS THEREOF

CROSS REFERENCE TO RELATED APPLICATION

The present application is based on and claims the benefit of priority of Japanese Patent Application No. 2017-016716, filed on Feb. 1, 2017, the disclosure of which is incorporated herein by reference.

TECHNICAL FIELD

The present disclosure relates to an in-vehicle lighting apparatus disposed in a vehicle such as an automobile for alerting a driver of the vehicle by using a lighting device.

BACKGROUND INFORMATION

In-vehicle driver assistance apparatuses used to assist drive operations are known. For example, an apparatus disclosed in a patent document 1, i.e., Japanese Published Application 2013-161257 may detect other vehicles approaching and already in a subject vehicle's blind spot by using a camera, a radar sensor or the like, and notify the driver of the other vehicles. The apparatus in patent document 1 may, for example, detect vehicles in an adjacent lane approaching or already in the subject vehicle's blind spot and notify the driver, when the subject vehicle uses a turn signal/indicator to signal movement from a current lane to the adjacent lane.

The apparatus disclosed in the patent document 1 has a plurality of lamps vertically arranged on each of a front-right pillar and a front-left pillar (i.e., A-pillars) of the subject vehicle. When an adjacent vehicle approaches and enters the blind spot of the subject vehicle, the front pillar lamps on the A-pillar corresponding to the side of the approaching vehicle are lit in an upward manner (i.e., bottom most light to upper most light) to notify a driver of the subject vehicle to vehicle(s) approaching the subject vehicle's blind spots from behind. In such manner, front pillar lamps may clearly be recognized by a driver to notify and alert the driver to vehicles in adjacent lanes approaching and already in the subject vehicle's blind spot.

Such notification lamps embedded in a vehicle's A-pillars may be problematic however, when front/side curtain airbags are also installed in these front pillars as an occupant safety device. Front/side current airbags may be installed in a vehicle's pillars, including the front A-pillars to protect a vehicle's occupants at the time of a collision. Such front pillar lamps, as described in Patent Document 1, may interfere with the installation of the curtain airbags within the A-pillars and deployment of the curtain airbags in the A-pillars may cause the lights embedded in the A-pillar to break and scatter throughout the vehicle compartment during a collision of the subject vehicle.

SUMMARY

It is an object of the present disclosure to provide an in-vehicle lighting apparatus disposed in a vehicle to effectively alert and notify a driver of the subject of vehicle related information and events.

The in-vehicle lighting apparatus may include: a lighting device disposed in an interior compartment of a vehicle at a lower part of a vehicle's front or "A-pillar" and attached to an instrument panel: a vehicle information obtainer obtaining information regarding a state of the vehicle; and a light controller controlling the lighting device based on the vehicle information obtained by the vehicle information obtainer, in which the lighting device includes an indirect lighting part that directs light from a light source toward a surface of the A-pillar.

According to the above, when the vehicle information obtainer obtains the information regarding a state of the vehicle, the light controller controls the lighting device based on the obtained information. The controlled lighting of the lighting device may be able to notify and alert the driver to various types of vehicle information and events. The lighting device includes an indirect lighting part that directs light from the light source toward a surface of the A-pillar. That is, the surface of the A-pillar is lighted by the indirect lighting part.

Because the A-pillar is within a driver's field of view, lighting the A-pillar with lighting devices to communicate vehicle information and events allows the driver during vehicle operation to perceive such lighted, visual communication with very little to no eye movement while still maintaining visual contact on the road ahead. That is, the driver can visually recognize the light on the A-pillar while still maintaining focus on the road ahead. In addition, lighting the A-pillar to alert the driver of events such as the presence of another vehicle in the subject vehicle's blind spot naturally draws a driver's gaze toward a vehicle's side-view mirror (or fender mirror) where the driver can either visually confirm or receive additional information from the vehicle mirror regarding the presence of the other vehicle.

In the present disclosure, the lighting device is not disposed on the front pillar itself, but is disposed on an instrument panel below the front pillar. Therefore, the lighting device will not interfere with the installation or deployment of the curtain air-bag in A-pillar. As such, the aforementioned configuration of the in-vehicle lighting apparatus provides an effective way of notifying the driver of the subject vehicle of vehicle information and events.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
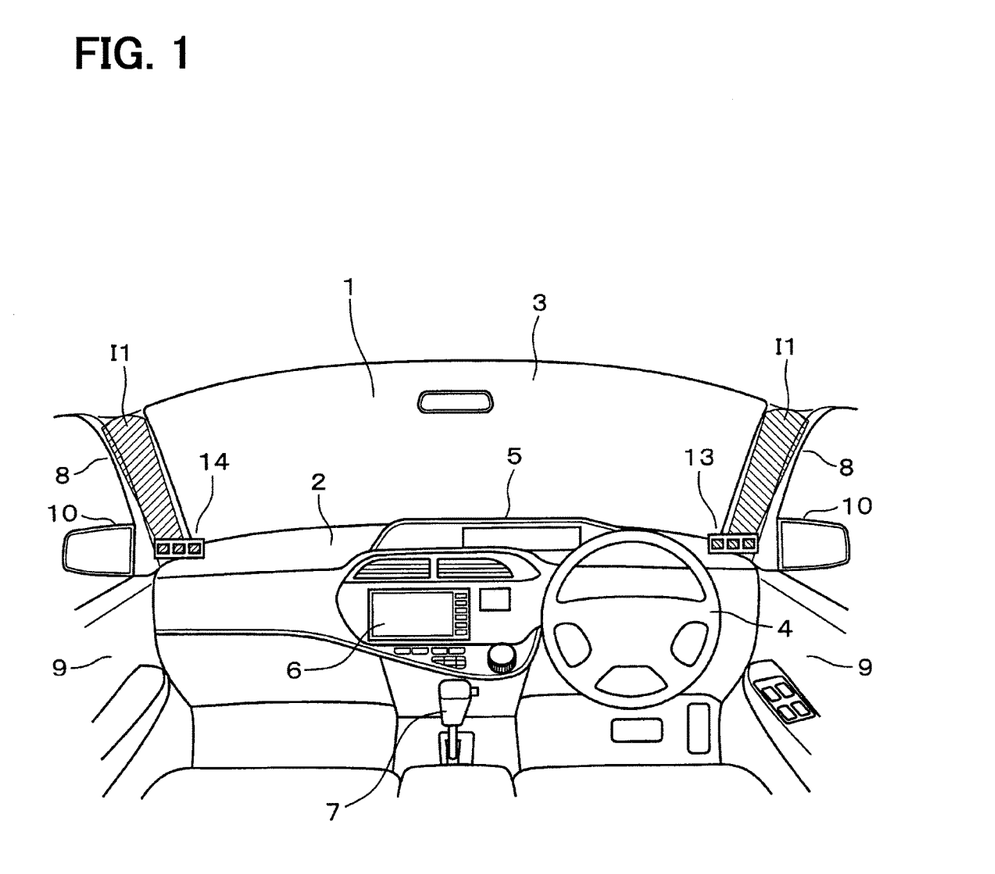
FIG. 1 illustrates a perspective view of an instrument panel in a front part of a vehicle's interior compartment.

The embodiments in the present disclosure may be applied to a passenger vehicle A, i.e., the subject vehicle, as shown for example in FIG. 6 and FIG. 7 and described with reference to the drawings. Note that the right and the left in the following description are made with reference to the driver of the subject vehicle A, i.e., a user, sitting in the driver's seat and looking in a forward direction, i.e. positioned to operate the subject vehicle A. FIG. 1 illustrates an instrument panel 2 and a windshield 3 in a front part of the subject vehicle A as seen from the inside of a vehicle compartment 1, showing a driver's seat on the right side and a passenger seat on the left side. As used herein, the description of subject vehicle A and corresponding drawings corresponds to a right hand drive (RHD) vehicle used in left-hand traffic (LHT), for example, like vehicles produced and sold in the Japanese market. However, such arrangement is not limited to RHD vehicles and may be adapted to a left hand drive (LHD) vehicle used in right-hand traffic RHT, for example, like vehicles sold in the American market.

As shown in FIG. 1, the instrument panel 2 extends laterally, i.e., from right to left in the front part of the vehicle A in the vehicle compartment 1, and a steering wheel 4 is disposed on the right-hand side in front of the driver's seat. A central portion of the instrument panel 2 may have a meter part 5 and a center display part 6, and the like disposed thereon. A shift lever 7 is disposed on a center console portion between the driver's seat and the passenger seat.

Figure 3:
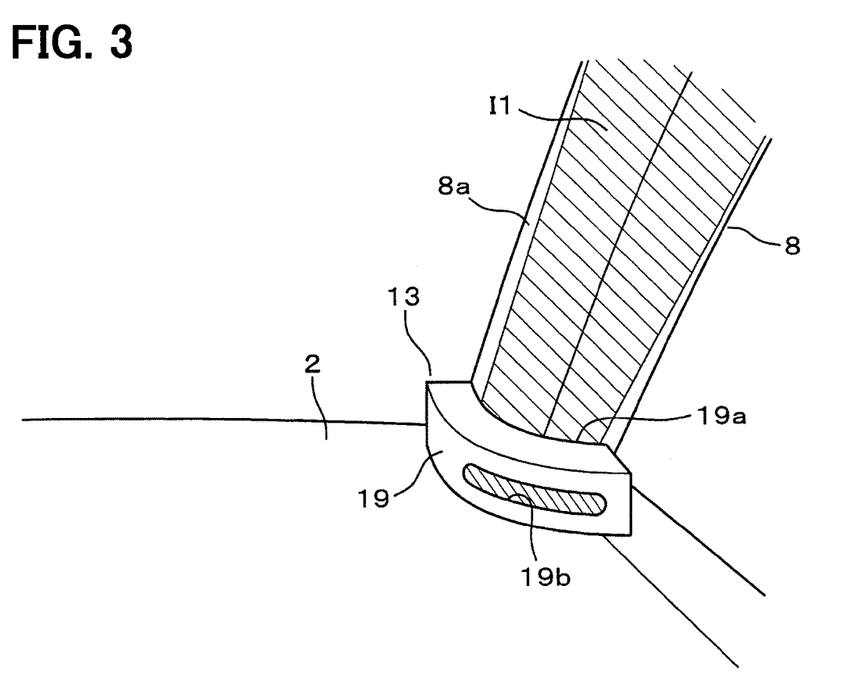
FIG. 3 illustrates a perspective view of a lighting device on a right side of the vehicle interior compartment.
Figure 4:
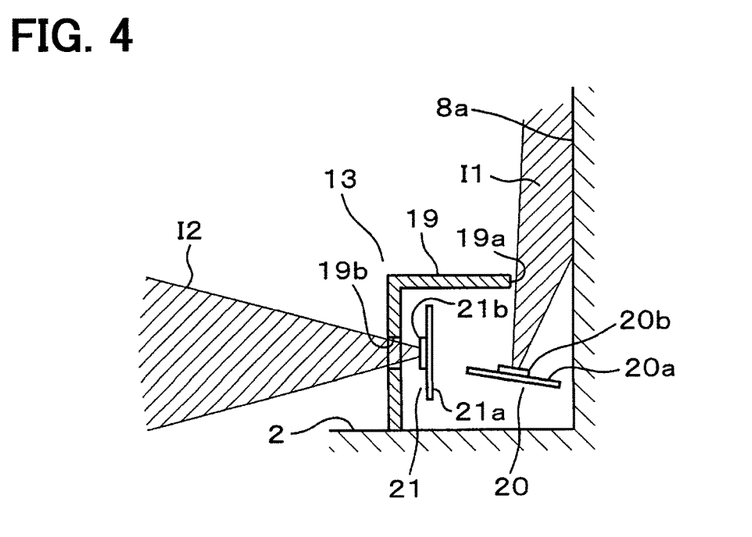
FIG. 4 illustrates a cross sectional view of the lighting device on the right side of the vehicle.

The front or "A-pillars" 8 are part of the body of subject vehicle A and rise from behind the right-side and left-side ends of the instrument panel 2. The windshield 3 is disposed at a position in between the A-pillars 8. Doors 9 are disposed on the right side and the left side of the vehicle body and are configured to open and close to allow the driver and passenger to enter and exit the interior vehicle compartment 1. A side-view mirror 10 is attached to each of the doors 9. With reference to FIGS. 3 and 4, though not illustrated in great detail, portions each of the A-pillars within the vehicle compartment 1 may be finished with a "trim package" to include, for example, a natural or synthetic surface material 8a such as a hide, skin, resin, or other upholstery attached on an inner side of a pillar shell. A curtain air-bag (not shown) installed in the shell of A-pillars 8 may be installed under the surface material 8a.

Figure 2:
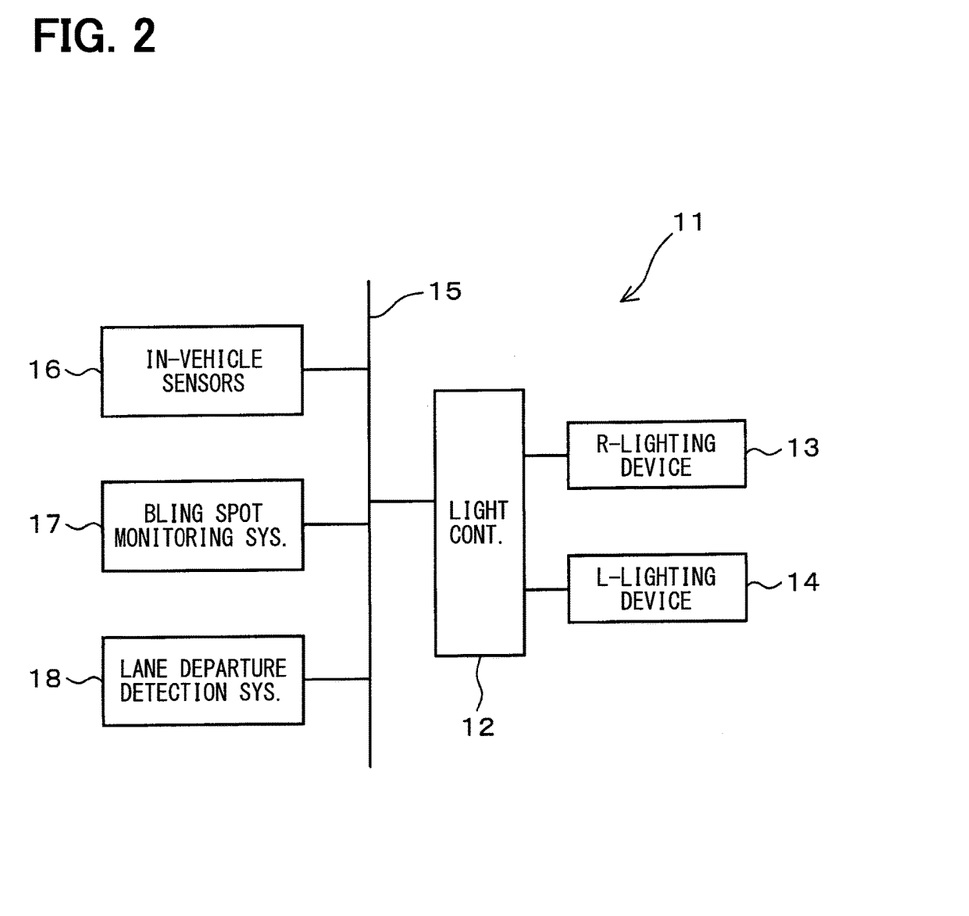
FIG. 2 illustrates a block diagram configuration of an in-vehicle lighting apparatus.

An in-vehicle lighting apparatus 11 described by the embodiments herein may be disposed in the subject vehicle A. FIG. 2 shows a system configuration of the in-vehicle apparatus 11. The in-vehicle lighting apparatus 11 includes a light controller 12 together with lighting devices 13 and 14 disposed respectively on the right side and the left side of the vehicle compartment 1. The lighting devices 13 and 14 are controlled by the light controller 12.

As shown in FIG. 1, the right side lighting device 13 is located at the lower part of the right-hand side A-pillar 8 and is disposed on the instrument panel 2. The left side lighting device 14 is located at the lower part of the left-hand side A-pillar 8 and is disposed on the instrument panel 2.

The light controller 12 may be a microcomputer and other peripheral components and configured to control lighting of the lighting devices 13 and 14, as well as other operations based on vehicle information. As shown in FIG. 2, the light controller 12 is connected to an in-vehicle local area network (LAN) 15, such as CAN (Controller Area Network), for example. The in-vehicle LAN 15 may also connect to various in-vehicle sensors 16, a blind spot monitoring system 17, a lane departure detection system 18, and the like. Each of the blind spot monitoring system 17 and the lane departure detection system 18 may include function specific sensors to realize the function specific to each system. For example, the blind spot monitoring system 17 may use optical sensors, cameras, radar sensors, and the like to detect the presence of another vehicle in the blind spot of the subject vehicle A. Likewise, the lane departure detection system 18 may use optical sensors, cameras, gps, signals input from the subject vehicle A's turn signals, and the like to detect the actual or probable departure of the subject vehicle from the current lane of travel. Alternatively, both the blind spot monitoring system 17 and the lane departure detection system 18 may rely on the various vehicle sensors 16 to execute the intended function of each system. The ON-OFF signals corresponding to a position of an ignition switch of the subject vehicle A may be input to the light controller 12 via the in-vehicle LAN 15. The light controller 12 may function as a vehicle information obtainer that obtains various kinds of vehicle information for the subject vehicle A via the in-vehicle LAN 15.

The various in-vehicle sensors 16 may include, for example, a brightness sensor for detecting an environmental brightness around the subject vehicle A, a door latch sensor for detecting an open or closed position of the doors 9, a shift position sensor for detecting a shift position (i.e., a drive mode), a speed sensor, and the like.

Based on the detection signal of the brightness sensor 16, the light controller 12 can determine based on the environmental brightness/darkness whether the subject vehicle A is operating during the day or the night. In such manner, the light controller 12 may be used as a brightness determination device or "brightness determiner." "Brightness," as used herein, may refer to a physical value measurable by sensor 16, such a unit of illuminance, such as lux, units of luminous flux, such a lumens, units of luminous intensity, such as candelas, and the like. The light controller 12 or brightness determiner 12 may use the measured or detected brightness value from sensor 16 in comparison to a threshold value stored in the light controller 12 to determine the brightness of a vehicle operating environment. For example, the brightness determiner 12 may receive a signal corresponding to a brightness measurement made by brightness sensor 16 indicating an illuminance value of 20 lux which may fall below a threshold value of 40 lux indicating that the in-vehicle lighting apparatus should operate in a night mode. The brightness sensor may be positioned to determine a brightness of the vehicle operating environment outside of the vehicle, may be positioned to determine a brightness inside the vehicle compartment 1, or both. A solar radiation sensor 16 or the like may be used in place of the brightness sensor 16 to determine the brightness/darkness of a vehicle environment. Switching the vehicle headlamps ON-OFF may be used to indicate a vehicle environmental brightness, or alternatively, a timer/clock may be used to determine day and night, and thus determine the brightness of a vehicle environment.

Figure 6:
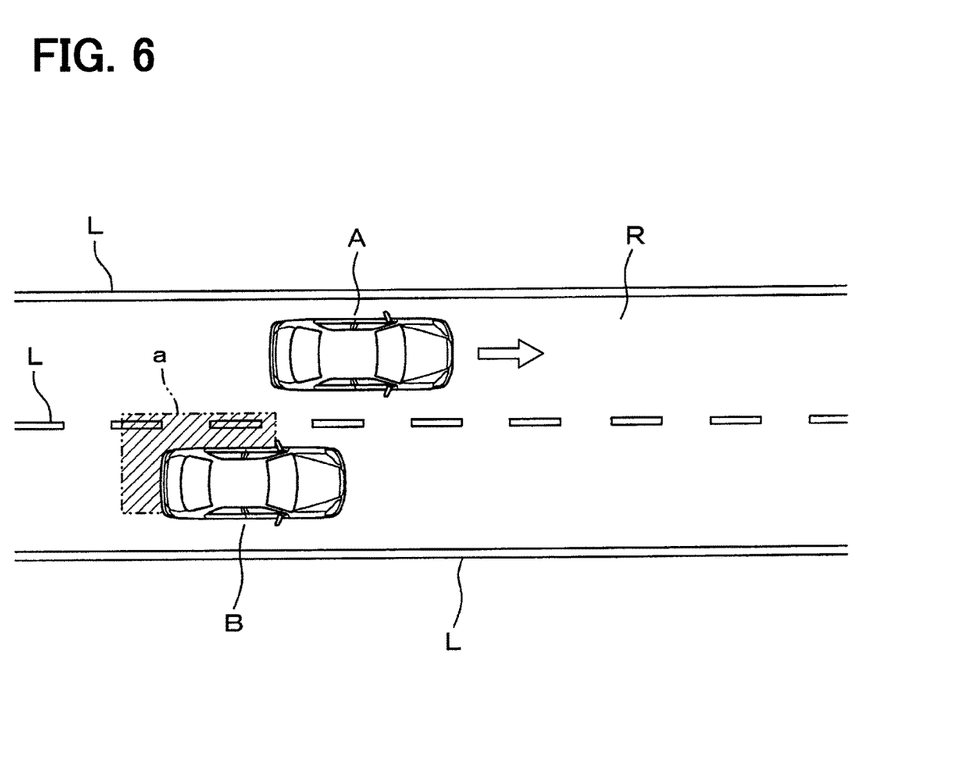
FIG. 6 illustrates a blind spot monitoring system.

As shown in FIG. 6, the blind spot monitoring system 17 may obtain detection information of another vehicle B in an adjacent lane as it approaches or enters the blind spot of the subject vehicle A and notify the driver of subject vehicle A of vehicle B's position in the blind spot. The blind spot monitoring system 17 may use cameras and/or radar sensors (both not shown) for detecting the approach or entry of vehicle B into the blind spot of the subject vehicle A during vehicle travel on road R. The blind spot monitoring system 17 may generate a detection signal indicating the presence of another vehicle in the blind spot of the subject vehicle and provide this detection signal via LAN 15 as vehicle information indicating the presence of another vehicle in the blind spot of the subject vehicle A. The blind spot monitoring system 17 may notify the driver of the subject vehicle A of vehicle B's presence by turning ON an indicator on the door mirror 10 on the side corresponding to the approaching vehicle B, for example, the right side, as shown in FIG. 6. In FIG. 6, although only the detection of vehicle B in the right rear blind spot of the subject vehicle A is illustrated, vehicle B may also be detectable in the left rear blind spot of the subject vehicle A.

Figure 7:
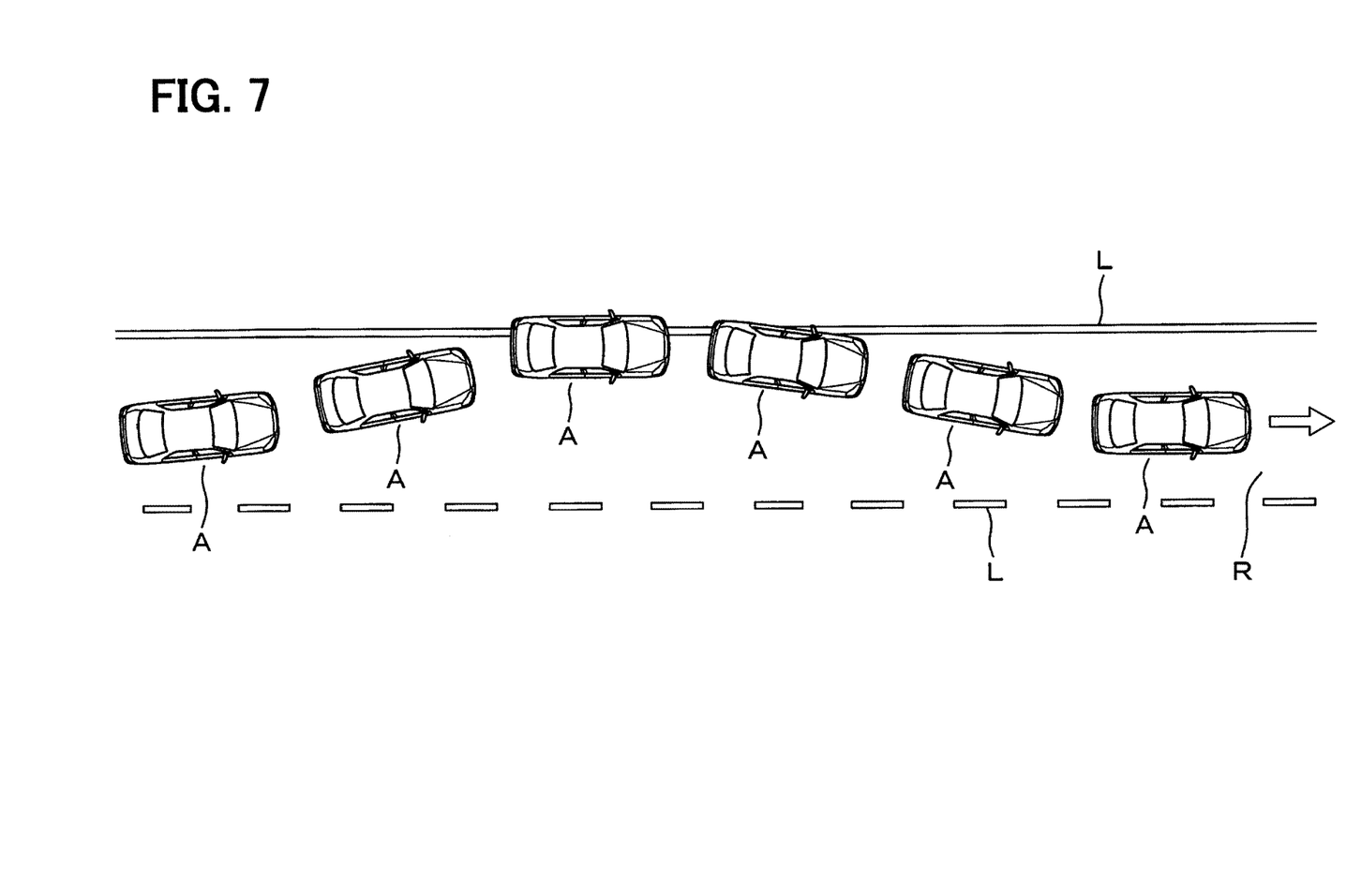
FIG. 7 illustrates a lane departure detection system.

With reference to FIG. 7, the lane departure detection system 18 may detect either an actual departure or probable departure of the subject vehicle A from the current lane of travel, and notify the driver of the actual/probable lane departure. The lane departure detection system 18 may be configured to assist the driver with an operation of the steering wheel 4 (i.e., lane keeping assist) to maintain the subject vehicle A in the current lane of travel.

The lane departure detection system 18 may detect solid and dashed lines L of different colors (i.e., yellow, white, etc.) on the road R with a camera. By detecting such lines L and monitoring the switching of the vehicle turn signals, the lane departure detection system 18 may notify the driver of the subject vehicle A when the subject vehicle A comes close to departing or has departed from the current lane of travel when a driver fails to signal his/her intention to depart the lane by using the vehicle turn signals. For example, the lane departure detection system 18 may notify the driver by displaying an alert message on the center display part 6, by using a buzzer or other audio indication, providing a tactile feedback to the driver, and the like. The lane departure detection system 18 may generate a detection signal indicating the actual or probable departure of the subject vehicle A from the current lane of travel and provide this detection signal via LAN 15 as vehicle information indicating the actual or probable departure of the subject vehicle A from the current lane of travel.

With reference to FIGS. 3 and 4, the lighting devices 13 and 14 on the right-hand side and left-hand side have the same, i.e., symmetrical, configuration, although FIGS. 3 and 4 only show the right-hand side lighting device 13. Hereafter, the configuration of the right-hand side lighting device 13 is described as a representative example of both lighting devices 13 and 14. The lighting device 13 includes a case 19 and an indirect lighting part 20 and a direct lighting part 21 inside the case 19.

As shown in FIG. 3, the top view of the case 19 shows the case 19 extending laterally in a curved, box shape at the bottom of the right A-pillar 8.

In FIG. 4, the case 19 has an opening 19a near the top, rear side closest to the right A-pillar 8, and an opening 19b near the front, bottom side and oriented toward the driver. The case 19 is attached onto an upper surface of the instrument panel 2, at a position close to the lower end of the A-pillar 8, and facing toward the driver/passenger. A top face of the case 19 has a light hole 19a for projecting light in an upward direction onto the A-pillar 8. A front face of the case 19 oriented toward the driver has a light permeable window 19b that outputs, or projects, a light toward the driver.

As shown in FIG. 4, the indirect lighting part 20 may use a chip-type LED 20b mounted on a circuit board 20a as a light source, which may be positioned on a back side of the case 19 near the A-pillar 8 and oriented to project light onto the A-pillar 8. As shown, indirect lighting part 20 is slightly tilted, but is not limited to this orientation for projecting light onto the A-pillar 8. The LED 20b is a full color LED that is capable of outputting light in any color. Thus, as shown in FIGS. 3 and 4, when the LED 20b is turned ON, an indirect lighting light I1 is projected upward from the indirect lighting part 20, through the light hole 19a, and onto the surface of the A-pillar 8. More specifically, the light I1 may be projected onto the trim material 8a on the A-pillar 8 to indirectly light the A-pillar 8. The trim material 8a may include specific colors and surface finishing to enhance the light I1 projected onto the A-pillar 8.

The direct lighting part 21 may use a chip-type LED 21b mounted on the circuit board 21a as a light source, which may be positioned behind the light permeable window 19b on the front face of the case 19 and oriented toward the driver. Similar to LED 20b, the LED 21b of the direct lighting part 21 may also be a full color LED that is capable of outputting light in any color. Thus, as shown in FIG. 4, when the LED 21b is turned ON, a direct light I2 may be projected from the direct lighting part 21 through the light permeable window 19b toward the driver for direct viewing by the driver. In other words, the direct light I2 from the direct lighting part 21 is projected from the case 19 away from the A-pillar 8 and directly toward the forward occupancy positions (i.e., the driver and front passenger seats) in the interior vehicle compartment 1.

The indirect lighting part 20 and the direct lighting part 21 are respectively equipped with the LED 20b and the LED 21b as light sources.

The indirect lighting part 20 (i.e., the LED 20b) and the direct lighting part 21 (i.e., the LED 21b) are operated by the light controller 12. The light controller 12 turns ON and OFF the indirect lighting part 20 and the direct lighting part 21, as well as controlling the color of light emitted by each of the lighting parts 20 and 21. The light controller 12 may execute a control program or software to control the ON/OFF operation and the light color adjustment of the LEDs 20b and 21b in each of the lighting devices 13 and 14 based on the vehicle information obtained from the vehicle components via the in-vehicle LAN 15.

In the present embodiment, the light controller 12 changes the color of the lights I1 and I2 as a mode of lighting by the lighting devices 13 and 14 according to the vehicle information. That is, the light controller 12 controls the lighting devices 13 and 14 to emit lights I1 and I2 in different colors to render different lighting modes. In a normal operating mode, that is at a normal travel time or during normal travel or operation of the subject vehicle A, the driver may be notified of a vehicle state by using both of the lighting devices 13 and 14. As used herein, "normal" may imply the normal operation of the subject vehicle where the lighting devices 13 and 14 are used to convey vehicle information such as vehicle states, and not alerts or warnings. As a default setting, for example, the lighting devices 13 and 14 may output a green colored light during a normal travel time or during normal operation of the subject vehicle A.

For example, when the subject vehicle A is normally traveling, the light controller 12 may control the LEDs 20b and 21b to output a green color light when the subject vehicle A is travelling at a constant speed, output a blue color light when the subject vehicle A is decelerating, and output a yellow color light when the vehicle is accelerating. To alert or warn the driver, the controller light controller 12 may instruct the LED 20b and the LED 21b to emit an orange or red colored light.

Based on the detection signal from the brightness sensor, the light controller 12 determines brightness/darkness of the operating environment of the subject vehicle A and sets either a day mode or a night mode. In such case, the light controller 12 may set the night mode if the brightness around the vehicle A is low, i.e., operating in a dark environment, and instruct the lighting devices 13 and 14 to emit light via the indirect lighting part 20. If the vehicle environment around the subject vehicle A is very bright, the light controller may set the day mode and instruct the lighting device to emit light via the direct lighting part 21.

The light controller 12 may also obtain vehicle information such as the presence of another vehicle B, when the blind spot monitoring system 17 detects that vehicle B is in the blind spot of the subject vehicle A. When the other vehicle B is detected in the blind spot of the subject vehicle A, shown as area "a" in FIG. 6, the driver may be notified by the presence of the vehicle B in the blind spot a by the light output of the lighting devices 13 and 14. For example, the lighting device 13 on the side of the subject vehicle A corresponding to the side on which the vehicle B enters the blind spot a may change the color of light I1 to red to alert the driver that the other vehicle B has entered the blind spot a on the right side of the subject vehicle A. The blind spot monitoring system may also turn ON a visual indicator on the side-view mirror 10 on the right side of the subject vehicle A to provide an additional notification of the presence of the other vehicle B in the blind spot a.

The light controller 12 may obtain vehicle information from the lane departure detection system 18 such as detection information regarding the actual or probable departure of the subject vehicle A from its current lane of travel. With reference to FIGS. 6 and 7, the lane departure detection system 18 detects lines L on either side of the subject vehicle A and compares the position of the subject vehicle A relative to the lines L and information from the vehicle turn signals to determine if the driver intends to move the subject vehicle A from the current lane of travel. When the lane departure detection system 18 detects an actual or probable departure of the subject vehicle A from the current lane of travel, the light controller 12 may operate the lighting devices 13 and 14 and change the color of lights I1 and I2 to notify the driver of the lane departure. For example, with reference to FIG. 7, when the subject vehicle A approaches the solid line L on the left side of the subject vehicle A, the left side lighting device 14 corresponding to the direction of lane departure may notify the driver by changing light I2 to an attention calling color such as red. The lane departure detection system may also provide additional notification such as a display message on the center display part 6 and the output of a buzzer sound to alert the driver of unintended lane departure.

The light controller 12 may obtain vehicle information regarding the position of subject vehicle A's ignition switch, i.e., ON and OFF, and vehicle information from a door latch sensor regarding the position of doors 9, i.e., open and closed. When doors 9 are opened, the lighting devices 13 and 14 that correspond to the side of the vehicle where the door 9 is open may be illuminated. For example, if the right side door 9 is opened, the lighting device 13 may emit light I1 in a warning color such as orange to alert the driver that the right side door 9 is open or ajar. If the subject vehicle A remains in an OFF state (i.e., the vehicle ignition switch is OFF) with a door 9 ajar, the lighting devices 13 and 14 may turn OFF i.e., stop emitting lights I1 and I2 after the lapse of a preset amount of time to conserve the charge level of a vehicle battery. When the ignition switch is turned ON, the lighting devices 13 and 14 may reilluminate to alert the driver of an open door 9.

Figure 5:
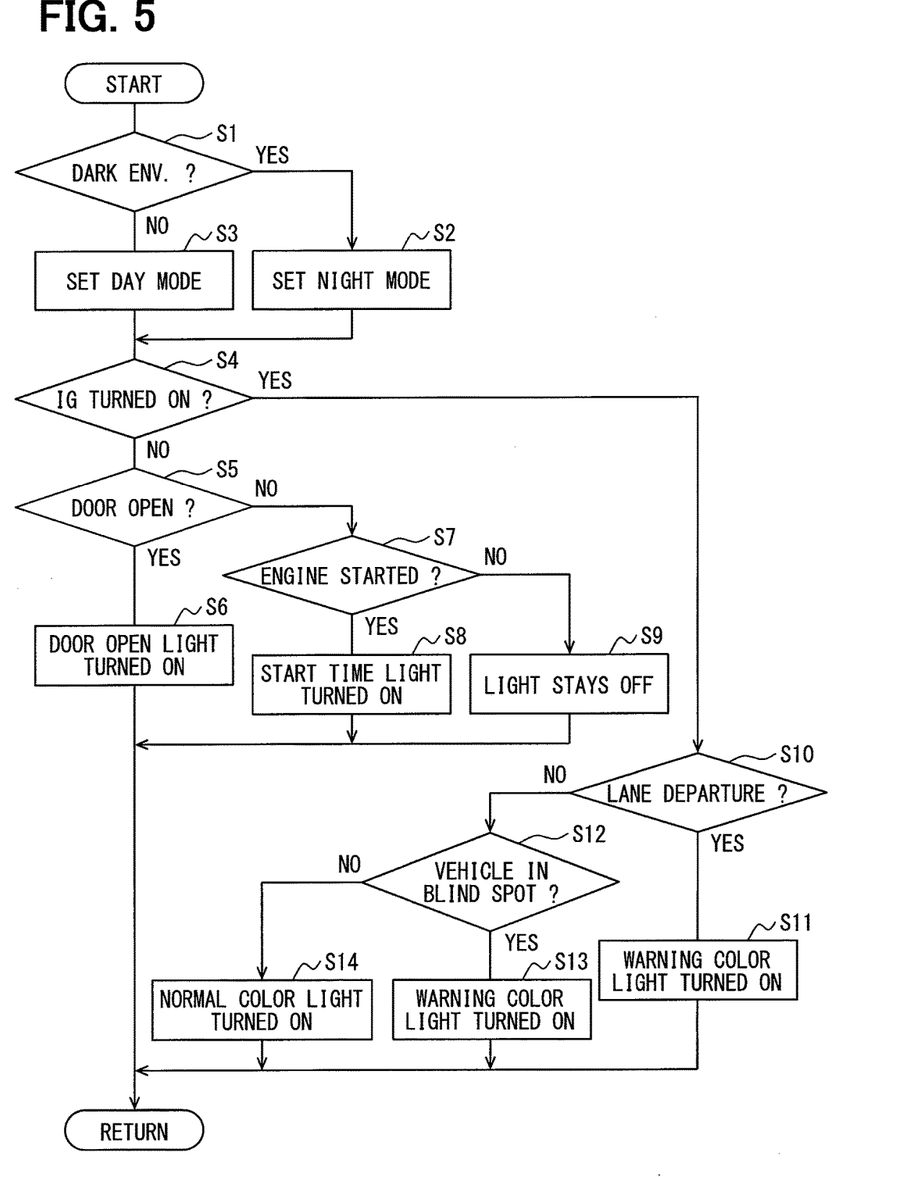
FIG. 5 is a flowchart of a control process performed by a light controller.

With reference to FIG. 5, a flowchart describes the operation of the in-vehicle lighting apparatus 11. The flowchart in FIG. 5 shows a control process performed by the light controller 12 to control the lighting devices 13 and 14. At S1, the brightness of the operating environment for the subject vehicle A is determined first based on the detection signal of the brightness sensor. When the environment is dark (i.e., YES at S1), the night mode is set at S2. When the environment is bright (i.e., NO at S1) the day mode is set at S3. As described above, the lighting devices 13 and 14 may emit light via the indirect lighting part 20 when operating in the night mode setting and emit light via the direct lighting part 21 when operating in the day mode setting.

At S4, the light controller 12 determines whether the ignition switch is turned ON (i.e., IG ON). In an ignition switch OFF state (i.e., NO at S4), the light controller 12 determines at 55 whether the doors 9 are open. When at least one of the doors 9 is open (i.e., YES at S5), at S6, one of the lighting devices 13 and 14 on the side of the subject vehicle A corresponding to the open door 9 operates to emit lights I1 or I2 in a red or orange color to indicate that one of the doors 9 is open, and the process returns to a main routine or the like.

On the other hand, when both of the doors 9 are closed (NO at S5), the light controller 12 determines at S7 whether the ignition switch is turned ON and whether the engine or a motor of the subject vehicle A is started. When the ignition switch is turned ON (i.e., YES at 87), at 88, the lighting devices 13 and 14 operate to emit light in a start time color of green, and then the process returns to a main routine or the like. When the ignition switch stays in an OFF state (i.e., NO at S7), at S9, the lighting devices 13 and 14 remain OFF, i.e., are not illuminated, and the process returns to a main routine or the like.

When the ignition switch is turned ON at S4 (i.e., YES at S4), at S10, the lane departure detection system 18 determines whether the subject vehicle A is departing from the current lane. At S10, when it is determined that the vehicle A is possibly or actually departing from the current lane (i.e., YES at S10), at S11, one of the lighting devices 13 or 14 on the departure side operates to emit lights I1 or I2 in an attention calling color like red, and the process then returns to a main routine or the like. The color of the light I1 or I2 from one of the lighting devices 13 or 14 on the other side, i.e., on the non-departure side, may remain in a normal travel time color.

When it is determined at S10 that the subject vehicle A is not possibly or actually departing from the current lane (i.e., NO at S10), at S12, the blind spot monitoring system 17 determines whether the other vehicle B is present (i.e., detected) in the blind spot area a. When the other vehicle B is detected in the blind spot area a (i.e., YES at S12), at S13, one of the lighting devices 13 or 14 corresponding to the side of the subject vehicle A on which vehicle B is detected operates to output the lights I1 or I2 in an attention calling color like red, and the process returns to a main routine or the like. The light controller 12 controls the other one of the lighting devices 13 or 14 on the side of the subject vehicle A where the vehicle B is not detected so that lights I1 or I2 remain unchanged from the normal travel time color. When it is determined that the other vehicle B is not detected or present in the blind spot area a (i.e., NO at S12), at S14, the lighting devices 13 and 14 operate to emit the lights I1 and I2 in the normal travel time color, and the process returns to a main routine or the like.

The lighting devices 13 and 14 are controlled by the light controller 12 as mentioned above, and the driver is notified and alerted to various vehicle information by the lighting projected from and onto the A-pillar 8. In such case, since the mode of the lights and the color of the lights I1 and I2 emitted by the lighting devices 13 and 14 differs for various vehicle information, alerts and notifications provided by the lighting devices 13 and 14 of the in-vehicle lighting apparatus 11 may be easily recognized by the driver.

Notification and alerts by the lights I1 and I2 output by the lighting devices 13 and 14 of the in-vehicle lighting apparatus 11 are, even in a bright environment, controlled to be easily recognizable. That is, the indirect lighting alone may be a bit difficult to recognize in a bright environment. However, in bright environments a day mode setting may operate so that the lighting devices 13 and 14 emit a brighter more direct light I2 from the directing lighting part 21 toward the driver while the indirect lighting part 20 of the lighting devices 13 and 14 emits a softer, less bright indirect light I1 onto the surface of the A-pillar 8 while operating in a night mode or in darker environments so as to not affect a driver's visual adjustment to low-light conditions and preserve a driver's night vision. As such, regardless of bright or dark operating environments, the lighting devices 13 and 14 of the in-vehicle lighting apparatus 11 are controlled to provide an easy-to-view and recognizable light to the driver to convey vehicle information and provide visual alerts to the driver.

Since the lighting devices 13 and 14 including the indirect lighting part 20 are disposed at the lower part of the A-pillars 8, such arrangement enables the indirect light I1 to be directly emitted onto the surface of the A-pillars 8 to provide the driver with an easily viewable and easy to recognize lighting. That is, since the lighting devices 13 and 14 illuminate or light an easy-to-view object, such as the A-pillar 8 that is already in the driver's field of view when operating the subject vehicle A, the driver can visually recognize the lighting on or projected from the A-pillar 8 with little to no eye movement. Further, when the driver looks at the side-view mirrors 10 (or at another side mirror such as a wing/fender mirror) while driving, the lights I1 and I2 projected from and onto the A-pillars 8 remain within the driver's field of view. Alternatively, when the driver's view is drawn to the lights I1 and I2 projected from and onto the A-pillar 8, the driver's view may be naturally drawn to the side-view mirrors 10 at the same time.

The lighting devices 13 and 14 are not disposed on the A-pillar 8 itself, but are rather disposed on the instrument panel 2 near the lower part of the A-pillar 8. Therefore, when, for example, a curtain airbag is installed in the A-pillar 8, the curtain airbag can operate without interfering with the lighting devices 13 and 14 and the deployment of any airbags in the A-pillars 8 may not lead to the breakage and scattering of the components in the lighting devices 13 and 14. Therefore, the lighting devices 13 and 14 are enabled to effectively provide the driver of the subject vehicle A with easy to view visual alerts and notifications regarding vehicle information from vehicle devices and components in connection with the in-vehicle lighting apparatus 11.

When providing notifications to the driver, the mode of lighting by the lighting devices 13 and 14 may be changed based on the type of vehicle information, which may be realized by changing the color of the lights I1 and I2, which may further facilitate easy recognition by the driver.

The light controller 12 is configured to determine the brightness of the environment of the vehicle A based on signals from the brightness sensor, and to operate the indirect lighting part 20 of the lighting devices 13 and 14 when the vehicle environment is dark. In addition, when the vehicle environment is bright, the light controller 12 is configured to operate the direct lighting part 21 of the lighting devices 13 and 14. In such manner, regardless of the brightness/darkness level of the vehicle operating environment, the in-vehicle lighting apparatus 11 may provide easy to view and readily recognizable notifications and alerts to the driver.

The light sources of the indirect lighting part 20 and the direct lighting part 21 of the lighting devices 13 and 14 are provided as two separate LEDs 20b and 21b. In such case, by providing two light source LEDs instead of one, the light guiding structure of both of the indirect lighting part 20 and the direct lighting part 21 is simplified, compared to structures using only one LED as the light source. Further, the control of lighting and coloring of two LEDs is simpler than the one-LED configuration. That is, even though the present embodiment uses two LEDs, the structure and the control of the in-vehicle apparatus 11 is simplified to limit the complication of the control.

When a vehicle B is detected in the blind spot area a, a detection signal is sent to the light controller 12, so that the light controller 12 can control the lights I1 or I2 from the lighting device 13 or 14 on the side of the subject vehicle corresponding to side in which the other vehicle B has entered the blind spot a. In such case, the light color of the lights I1 or I2 may be in an attention calling red color to alert the driver of the presence of the vehicle B in the blind spot a. Thereby, the lights I1 and I2 projected from and onto the A-pillar 8 can effectively notify and alert the driver in an easily recognizable manner as to the existence of the other vehicle B in the blind spot a. That is, the driver is intuitively warned of the presence of another vehicle B in the blind spot a of the subject vehicle A and such lighting control provides additional information such as which side of the subject vehicle A the other vehicle B is adjacent to so that the driver may pay more attention to the blind spot area a on that side of the subject vehicle A. Therefore, such notifications from the in-vehicle lighting apparatus 11 may improve vehicle safety.

When the lane departure detection system 18 detects the possible or actual lane departure of the subject vehicle A from the current lane of travel, lane departure signals may be sent to the light controller 12 to light one of the lighting devices 13 or 14 on the lane departure side of the subject vehicle A to alert the driver of the lane departure. The lighting devices 13 or 14 may emit lights I1 and I2 in an attention calling color such as red to warn the driver of an unintended lane departure. Therefore, the lighting of the A-pillar 8 is effectively utilized to notify the driver of an actual or potential lane departure. The driver may also be intuitively warned as to which side of the lane the subject vehicle A is departing so that the driver may take evasive action and provide corrective measures to correct any unintended lane departures. Therefore, such notifications from the in-vehicle lighting apparatus 11 may improve driving safety.

Since the light controller 12 is configured to operate one of the lighting devices 13 and 14 on a side of the subject vehicle A where one of the doors 9 is ajar, a driver may be effectively notified if one of the doors 9 is in an open state.

The light controller 12 is configured to control the lighting of the lighting devices 13 and 14 even during normal travel time, such that, for example, the driver may be notified of the travel state of the subject vehicle A by the color of lights I1 and I2. For example, the driver may be notified of the current vehicle speed or acceleration based on the color of the lights I1 and I2. As such, the in-vehicle lighting apparatus 11 may not be limited to providing a driver with warnings and alerts, but may also provide the driver with notifications of a current vehicle state when the subject vehicle A operates in a normal operating mode.

Although the indirect lighting part 20 and the direct lighting part 21 are provided in each of the lighting devices 13 and 14, as described herein, the easy to view and easily recognizable notification of vehicle information may be provided at least by the indirect lighting part 20.

Although the operation of either the indirect lighting part 20 or the direct lighting part 21 is based on the brightness of a vehicle operating environment, the operation scheme of the in-vehicle lighting apparatus may be changed. That is, the indirect lighting part 20 may be operated regardless of the brightness of the vehicle environment, and/or the lighting may be performed by operating the indirect and direct lighting parts at the same time.

The color of the lights I1 and I2 may be changed based on different lighting modes. However, the mode of lighting may be changed in different manners. That is, for example, the light intensity or brightness of the light may be changed, and/or how the light is emitted in terms of ON-OFF, blinking, cycle and duration of an ON-OFF time, and movement of the light positions may also be changed. Various combinations of these modifications are also possible. The vehicle information obtained by the vehicle information obtainer, i.e. the light controller 12, may also be changed. That is, other vehicle information may be conveyed by the lights I1 and I2 of the lighting devices 13 and 14 of the in-vehicle lighting apparatus 11 such as: an inter-vehicle distance between the subject vehicle A and a lead vehicle to alert a driver of vehicle collisions; alerting the driver of in-road obstacles and/or pedestrians around the subject vehicle; and providing the driver with vehicle safety related information to support safe driving operations by the driver. Vehicle notifications of the vehicle states during normal operation and at a normal travel time may include notifications regarding shift positions, travel mode, eco-conscious driving, and the like.

In addition, as a lighting device, the indirect lighting part and the direct lighting part may be provided and implemented as one light source. Various changes and modifications may also be made for the configuration of the lighting device, such as the shape of the case, the installation and attachment method onto the instrument panel, and the optical configurations such as mirrors, lenses, optical waveguides and the like.

Although the present disclosure has been described with reference to the accompanying drawings, it is to be noted that various changes and modifications become apparent to those skilled in the art, and such changes, modifications, and summarized schemes are to be understood as being within the scope of the present disclosure as defined by appended claims.

What is claimed is:

1. An in-vehicle lighting apparatus comprising:
a lighting device disposed in an interior compartment of a subject vehicle and attached to a vehicle instrument panel near a lower part of a vehicle A-pillar;
a vehicle information obtainer configured to obtain vehicle information regarding a state of the subject vehicle; and
a light controller configured to control the lighting device based on the vehicle information obtained by the vehicle information obtainer, wherein
the lighting device includes an indirect lighting part that directs light from a light source configured therein onto a surface of the A-pillar.

2. The in-vehicle lighting apparatus of claim 1, wherein the light controller is further figured to operate the lighting device to render different lighting modes based on the vehicle information.

3. The in-vehicle lighting apparatus of claim 1 further comprising:
a brightness determiner configured to determine a brightness around the subject vehicle, wherein
the light controller operates the indirect lighting part of the lighting device when the brightness determined by the brightness determiner falls below a threshold value.

4. The in-vehicle lighting apparatus of claim 3, wherein
the lighting device further has a direct lighting part that directs light toward forward occupancy positions in the interior compartment, and
the light controller operates the direct lighting part of the lighting device when the brightness determined by the brightness determiner exceeds the threshold value.

5. The in-vehicle lighting apparatus of claim 4, wherein the direct lighting part also has a light source.

6. The in-vehicle lighting apparatus of claim 1, wherein
the vehicle information obtainer obtains, as the vehicle information, a detection signal indicating a presence of another vehicle in a blind spot of the subject vehicle, and
the light controller controls the lighting device based on the detection signal to emit a light that indicates the presence of the other vehicle.

7. The in-vehicle lighting apparatus of claim 1, wherein
the vehicle information obtainer obtains, as the vehicle information, a detection signal indicating an actual departure or a probable departure of the subject vehicle from a current lane of travel, and
the light controller controls the lighting device based on the detection signal to emit a light that indicates the actual departure or the probable departure of the subject vehicle from the current lane of travel.

8. The in-vehicle lighting apparatus of claim 1, wherein the light controller controls the lighting device during normal vehicle operation to emit a light that indicates a vehicle state of the subject vehicle.

9. An in-vehicle lighting apparatus comprising:
a lighting device disposed in an interior compartment of a subject vehicle and attached to a vehicle instrument panel near a lower part of a vehicle A-pillar, the lighting device including an indirect lighting part with a light source configured to generate a light within the lighting device and direct the light through an opening in a top of the lighting device onto the vehicle A-pillar; and
a microcomputer configured to obtain vehicle information of a subject vehicle and to control the lighting device based on the vehicle information, wherein
in response to the vehicle information, the lighting device emits the light onto the vehicle A-pillar.

* * * * *